United States Patent
Walker, Jr.

(10) Patent No.: US 8,075,031 B2
(45) Date of Patent: Dec. 13, 2011

(54) HVAC FILTER CHANGING SYSTEM

(76) Inventor: Robert D. Walker, Jr., Center Point, TX (US)

( * ) Notice: Subject to any disclaimer, the term of this patent is extended or adjusted under 35 U.S.C. 154(b) by 295 days.

(21) Appl. No.: 12/388,844

(22) Filed: Feb. 19, 2009

(65) Prior Publication Data

US 2010/0207407 A1    Aug. 19, 2010

(51) Int. Cl.
*B25J 1/02*    (2006.01)
(52) U.S. Cl. .............. 294/24; 294/210; 403/53
(58) Field of Classification Search ........... 294/19.1, 294/24, 61; 172/375, 380; 403/53, 91, 97
See application file for complete search history.

(56) References Cited

U.S. PATENT DOCUMENTS

| | | | |
|---|---|---|---|
| 831,066 A * | 9/1906 | Hawks | 294/24 |
| 3,739,562 A * | 6/1973 | McNamara | 56/400.06 |
| 3,797,581 A * | 3/1974 | Holloway | 172/372 |
| 4,019,769 A | 4/1977 | Filion | |
| 4,203,332 A * | 5/1980 | Corsetti | 81/484 |
| 4,726,090 A * | 2/1988 | Kilpatrick | 15/236.04 |
| 5,004,053 A * | 4/1991 | Martell | 172/375 |
| 5,016,504 A | 5/1991 | Brunetto et al. | |
| 5,405,177 A | 4/1995 | Goldstein | |
| 5,487,576 A | 1/1996 | DuVivier | |
| 5,513,889 A | 5/1996 | Fithen | |
| 5,665,145 A | 9/1997 | Goodman | |
| 5,964,489 A * | 10/1999 | Mahoney | 294/24 |
| 6,477,758 B2 | 11/2002 | Krebel | |
| 6,959,468 B1 | 11/2005 | Danger | |
| 7,132,048 B2 | 11/2006 | Hagashihara | |

* cited by examiner

Primary Examiner — Dean Kramer
(74) Attorney, Agent, or Firm — Edward B. Marvin; Gunn Lee & Cave

(57) ABSTRACT

An air conditioner filter removing system for air filters located in elevated return-air vents, such as return-air vent mounted in a ceiling or upper wall. The device consists of a filter-grabbing mechanism that can be mounted to an extension pole. The filter-grabbing mechanism has teeth protruding from it to grab an air filter and a holding plate where the filter is balanced once engaged by the teeth. In its preferred embodiment, the system has one or more magnets for holding the return-air vent door closed so the filter-grabbing mechanism can easily pull the vent open. Further, the preferred embodiment also has kicker plates that help removal of the teeth out of the grill louvers they are inserted into, on the vent door.

18 Claims, 8 Drawing Sheets

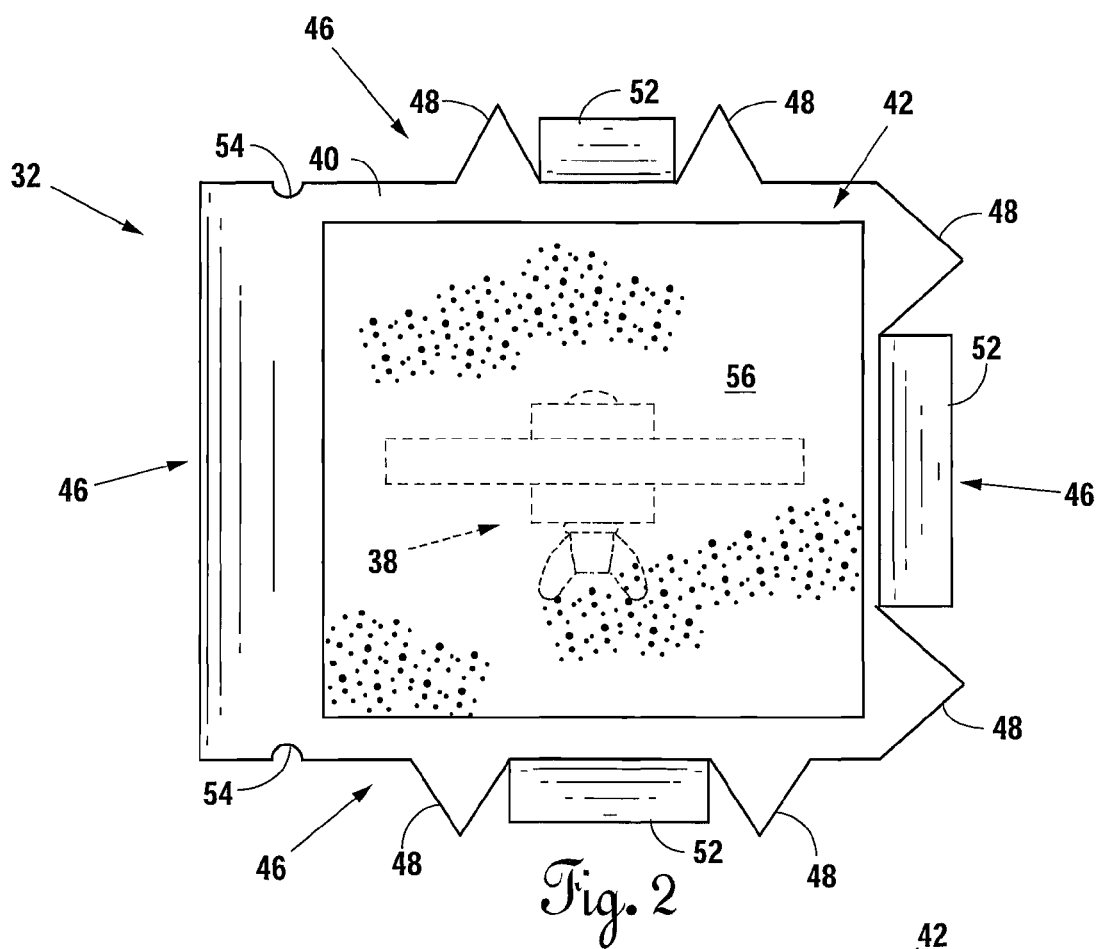
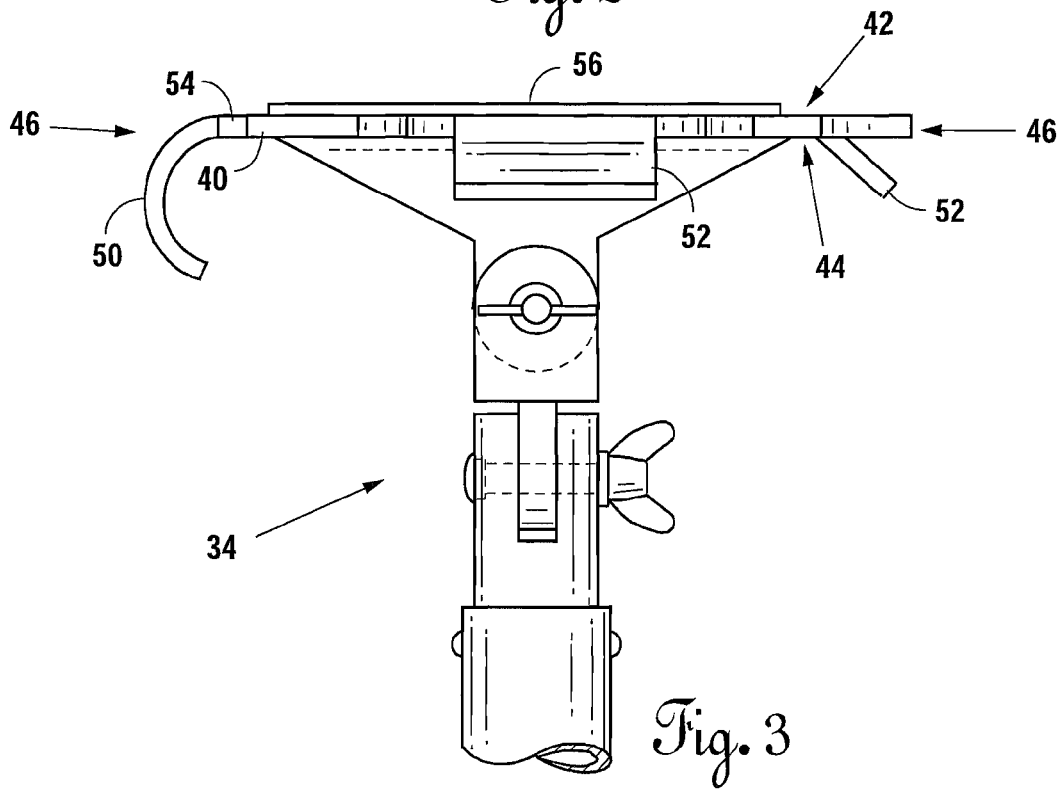

HVAC FILTER CHANGING SYSTEM

CROSS REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to a filter changing system for HVAC systems that have return-air vents mounted in elevated places such as ceilings or upper walls. More specifically, the invention relates to a filter-grabbing device that can be mounted to an extension pole. The filter-grabbing device is configured to open the vent door on an elevated return-air vent, take the dirty air filter from the vent, replace the dirty air filter with a clean air filter, and close the vent door.

2. Description of the Related Art

Within the field of HVAC repair and maintenance, there are numerous tools for repairing, calibrating, and generally maintaining HVAC systems. These tools are geared toward ensuring that the HVAC system is performing at its optimal level. Despite the crowded field, no known tool exists for changing air filters when the air filter is located in an elevated return-air vent.

During normal operation of an HVAC system, air is continually re-circulated through the system. As part of the re-circulation process, a blower inside the HVAC system pulls external air through a return-air vent. External air is the air located within the structure being heated, cooled, and/or ventilated by the HVAC system but not within the HVAC system itself. As the blower pulls external air through the return-air vent, the external air passes through an air filter and enters into the HVAC system. The number of return-air vents and corresponding air filters in an HVAC system varies, depending on the design of the particular system.

Air filters help prevent harmful dust and other particles from entering into the HVAC system. The filter media accumulates the dust and other particles as the external air passes through it. Once the filter media becomes saturated, the blower must work harder to pull the external air into the system, thereby increasing the strain on the blower. Increased strain on the blower may cause the blower to overheat and may cripple the HVAC system altogether. Thus, proper maintenance of an HVAC system requires air filters to be changed regularly.

To change the air filter, the return-air vent typically contains a vent door that is affixed to the vent perimeter of the return-air vent with hinges. When closed, one or more levers lock the vent door in place within the vent perimeter of the return-air vent. To open the vent door, an HVAC technician slides levers on the return-air vent into the unlocked position and pulls the vent door open. With the vent door now open, the technician removes the dirty air filter and replaces it with a clean one.

When return-air vents are located in elevated positions such as ceilings or upper walls, the technician cannot reach them without using a ladder. From a safety standpoint, each time a technician climbs a ladder to change an air filter there is a risk that the technician will fall from the ladder and sustain an injury. Further, if an elevated return-air vent is located over a piece of furniture or another item that is difficult to move, placing a ladder directly under the return-air vent may not be possible. Instead, the technician must position the ladder as close to the return-air vent as possible and reach for the vent. Of course, reaching for the vent while standing on a ladder only further increases the risk posed by elevated return-air vents. It is these elevated return-air vents to which the present invention is directed.

BRIEF SUMMARY OF THE INVENTION

The present invention is a filter-changing system that allows HVAC technicians or others to change air filters in elevated return-air vents without using a ladder. The filter changing-system consists of a filter-grabbing device with a mounting means that allows the filter-grabbing device to be mounted to an extension pole. Although a variety of mounting means are possible, in its preferred embodiment the mounting means allows for pivotal movement of the filter-grabbing device, with pivotal movement possible at a single axis of rotation or at two axes of rotation.

Preferably, the filter-changing system includes an improved holding means for holding the vent door in its closed position. The improved holding means is a separate piece from the filter-grabbing device and allows the vent door to be pulled open with the filter-grabbing device. In its preferred embodiment, the holding means is a plurality of magnets mounted to the vent perimeter of the return-air vent or a plurality of magnets mounted to the vent door.

In practice, the vent door should be opened with the filter-grabbing device while the blower is operating so the air filter remains in place from the suction of the blower. Using the filter-grabbing device, the air filter is grabbed, pulled from the vent perimeter of the return-air vent, and brought down from its elevated position. A new filter is then inserted on the filter-grabbing device, lifted into the elevated position, and placed within the vent perimeter of the return-air vent.

BRIEF DESCRIPTION OF THE DRAWINGS

FIG. 2 shows a top view of the preferred embodiment for the filter-grabbing device.

FIG. 3 shows a side view of the preferred embodiment for the filter-grabbing device and the preferred embodiment of the mounting means.

DETAILED DESCRIPTION OF THE INVENTION

Figure 1:
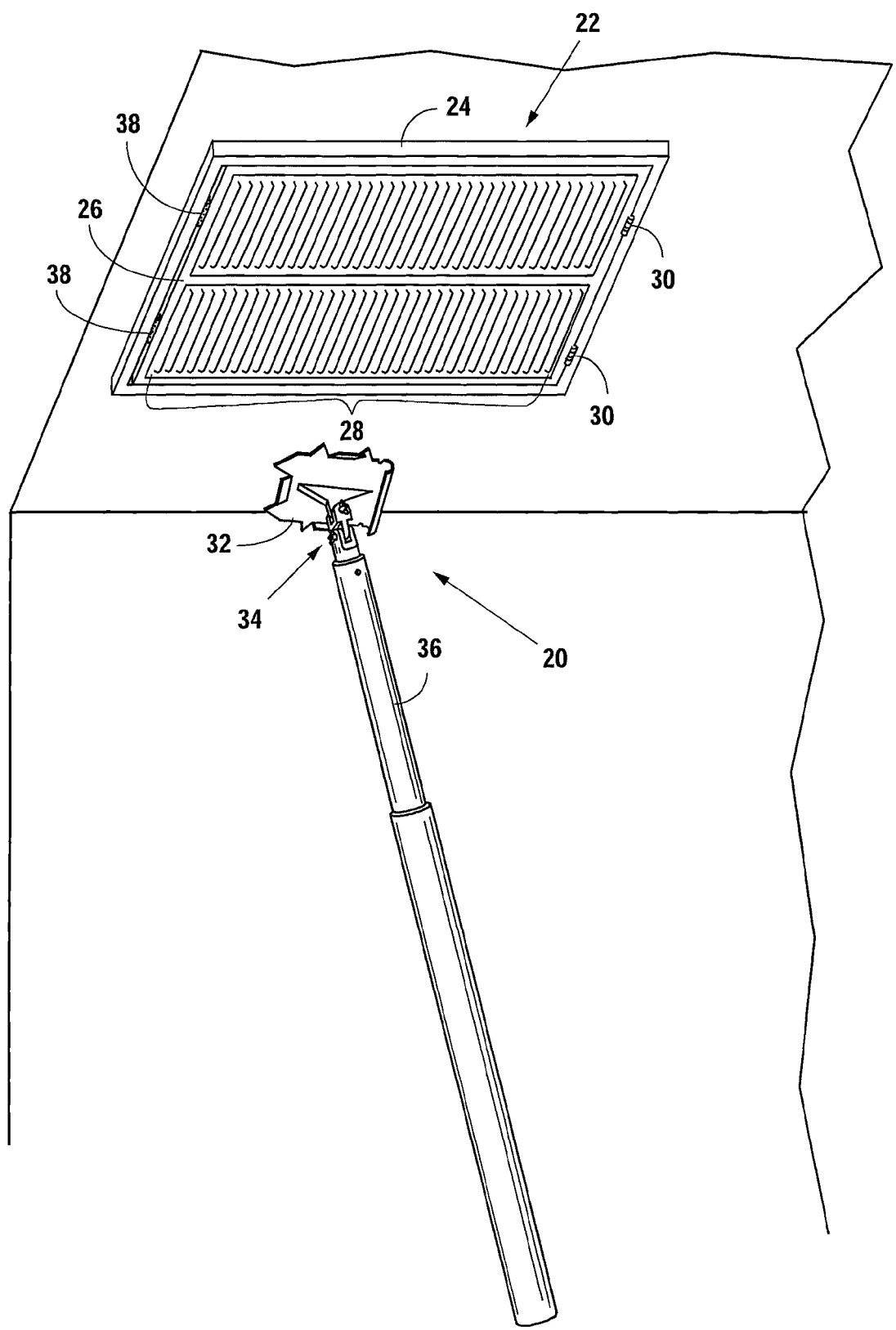
FIG. 1 illustrates a perspective view of incorporating the preferred embodiment of the filter-changing system of the present invention.

FIG. 1 is a bottom perspective view for the preferred embodiment of the present invention. FIG. 1 shows a filter-changing system 20 and a return-air vent 22 that is positioned in a ceiling. The return-air vent 22 has a vent perimeter 24 and a vent door 26 that contains grill louvers 28. The vent door 26 is attached to the vent perimeter 24 of the return-air vent 22 with hinges 30.

The filter-changing system 20 has a filter-grabbing device 32 and a mounting means 34 attached to the filter-grabbing device 32, which allows the filter-grabbing device 32 to be permanently or temporarily mounted to an extension pole 36. Preferably, the filter-changing system 20 includes a holding means 38 that creates a force to hold the vent door 26 closed at the vent perimeter 24 yet allows the vent door 26 to be pulled open with the filter-grabbing device 32.

FIG. 2 shows a top view of the filter-grabbing device 32 in its preferred embodiment. The filter-grabbing device 32 has a holding plate 40 with a substantially flat top surface 42 and a bottom surface 44 (see FIG. 3). The holding plate 40 has a plurality of sides 46 and is preferably shaped as a rectangle; however, the holding plate 40 can be variety of shapes.

Protruding from at least one of the plurality of sides 46 is a plurality of teeth 48 that are sized to fit between the grill louvers 28 on the vent door 26. Although a plurality of teeth 48 preferably protrude from holding plate 40, a single tooth sized to fit between the grill louvers 28 on the vent door 26 could protrude from the holding plate 40 and accomplish the object of the present invention. As shown in FIG. 3, the plurality of teeth 48 are aligned substantially planar to the top surface 42 of the holding plate 40. Although slight angling of the plurality of teeth 48 may be acceptable, the manner in which the filter-grabbing device 32 engages an air filter and the manner in which the air filter rests on the holding plate 40 dictates that the plurality of teeth 48 are substantially planar to the top surface 42.

In the preferred embodiment, the holding plate 40 has two teeth (i.e., a set) from the plurality of teeth 48 protruding from each of three sides from the plurality of sides 46. Instead of having teeth, the fourth side from the plurality of sides 46 has a curved end 50, which is large enough to prevent the fourth side from entering into the grill louvers 28 on the vent door 26. On each of the three sides that have a set of teeth, the two teeth are spaced a predetermined distance apart from one another, and, the predetermined distance between each set of teeth is different for each side.

In the preferred embodiment, the holding plate 40 also has a plurality of kicker plates 52 protruding from it, though a single kicker plate or even no kicker plate may be present in alternate embodiments. As shown in FIG. 3, the kicker plates 52 protrude from the holding plate 40 at a downward angle relative to the bottom surface 44 of the holding plate 40. Preferably, a single kicker plate protrudes from the holding plate 40 at each of the three sides where a set of teeth is present and protrudes from the predetermined distance between the teeth in each set of teeth.

Also present in the preferred embodiment is a plurality of notches 54 cut into the sides 46 of the holding plate 40, though a single notch or no notches may be present. The plurality of notches 54 are sized to accept at least a portion of an air register damper (not shown), so the filter-grabbing device 32 can readily move the air register damper. As such, the filter-grabbing device 32 can readily open and close air registers, thereby controlling the flow of air from the HVAC system into the structure that is being heated, cooled, and/or ventilated by the HVAC system from the floor.

FIGS. 2 and 3 also show a frictionous material 56 that is preferably on the top surface 42 of the holding plate 40. The frictionous material 54 is any material that increases the coefficient of friction for the top surface 42 yet substantially preserves the overall flatness of the top surface 42. In this regard, the air filter must still be able to balance on the top surface 42 of the holding plate 40 when the frictionous material 56 is present.

Figure 4:
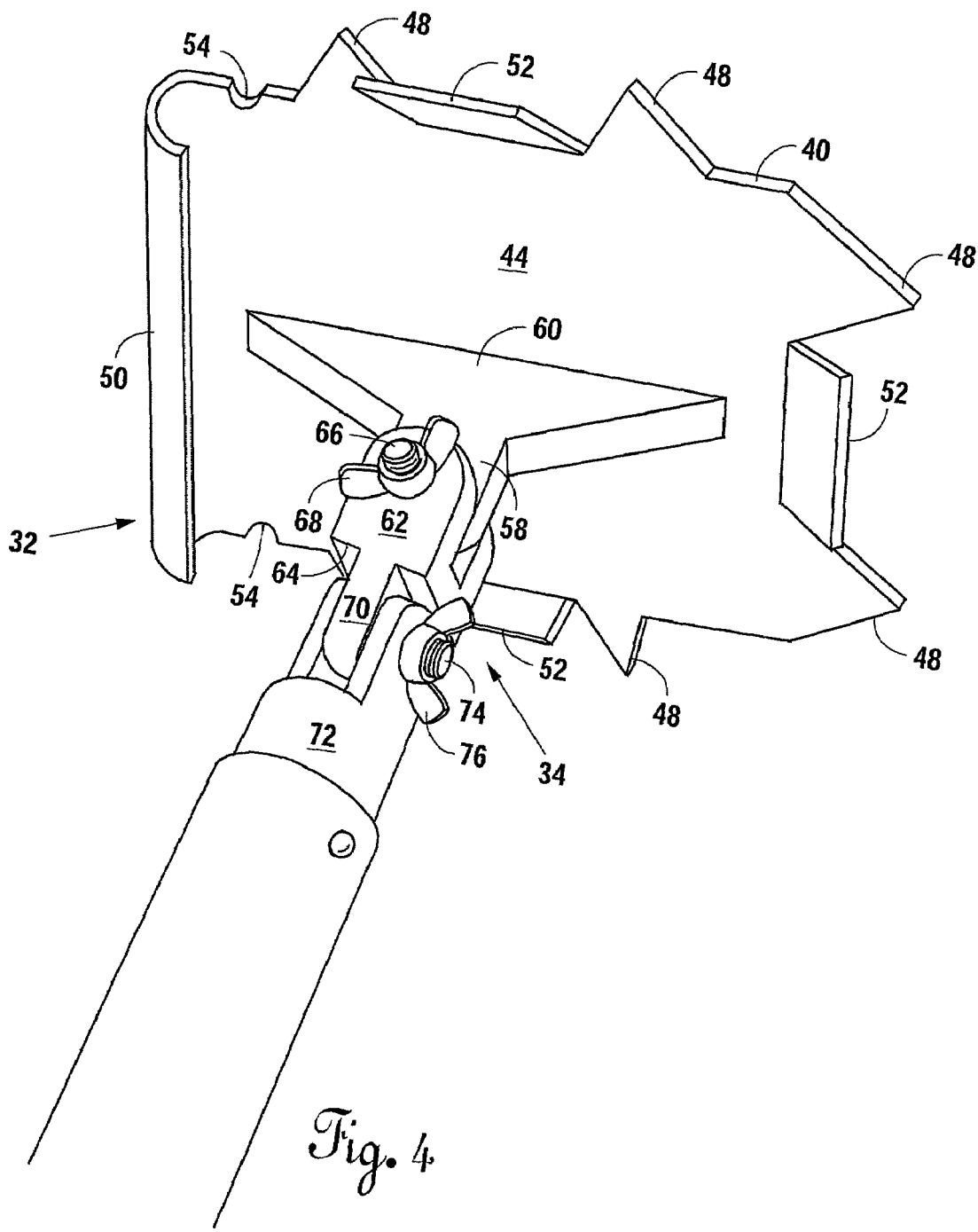
FIG. 4 shows a bottom perspective view of the preferred embodiment for the filter-grabbing device the preferred embodiment of the mounting means.
Figure 5:
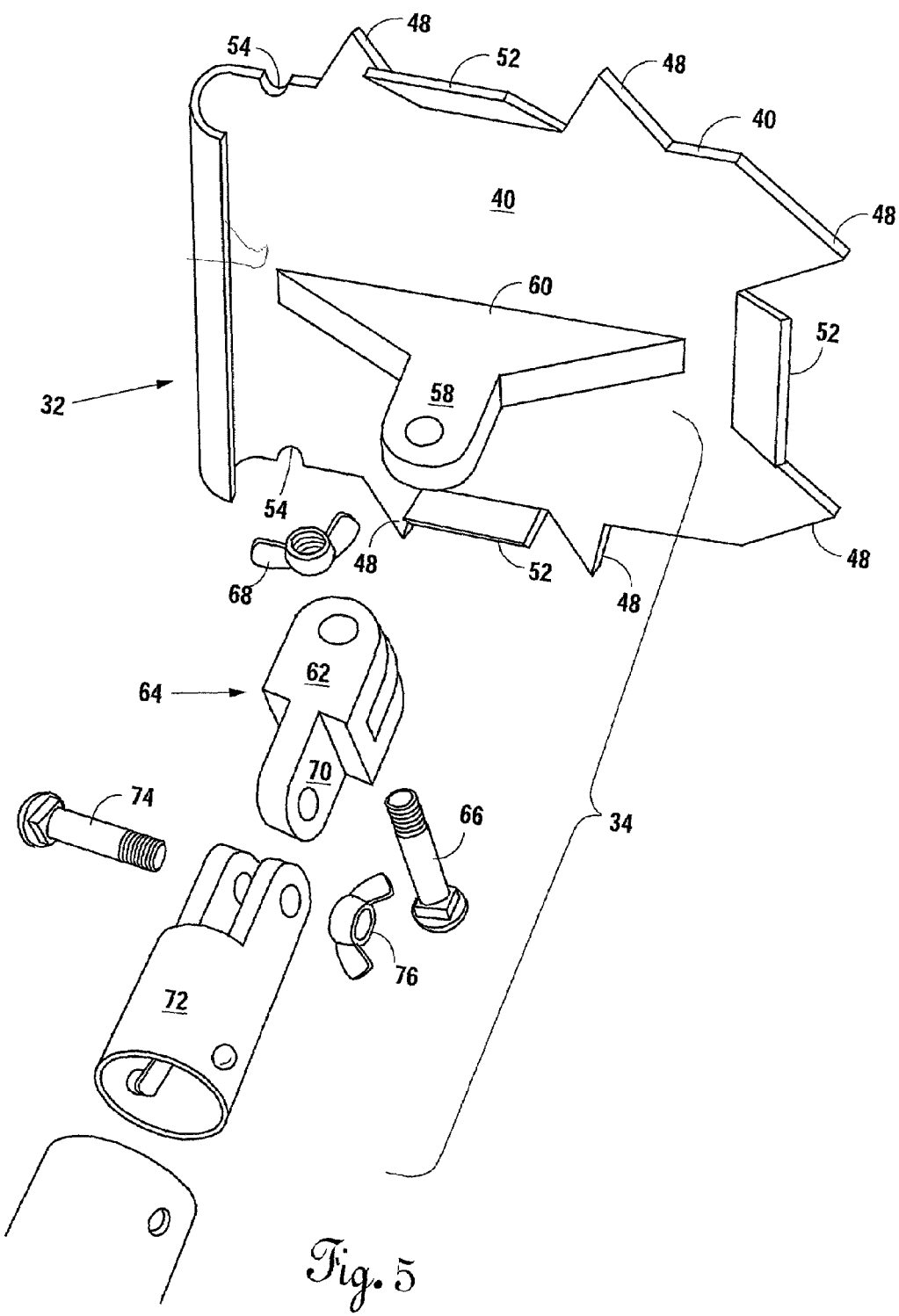
FIG. 5 shows an exploded, bottom perspective view of the preferred embodiment for the filter-grabbing device and the preferred embodiment of the mounting means.

FIG. 4 shows a bottom perspective view of the preferred embodiments of the filter-grabbing device 32 and the mounting means 34. The preferred mounting means 34 has a first clevis mount 58 attached to the bottom surface 44 of the holding plate 40. Preferably, the first clevis mount 58 has a wide base 60; however, the base 60 may be much narrower and may not be present at all. In addition, the first clevis mount 58 and the holding plate 40 are preferably manufactured as a single piece, but, the first clevis mount 58 may be a separately manufactured piece that is permanently or removeably attached to the bottom surface 44 of the holding plate 40.

The first clevis mount 58 is connected to a first clevis 62, which is located on a dual-pivot linkage 64, with a first clevis pin 66 and a first clevis wing nut 68. When connected, the first clevis mount 58 and the first clevis 62 form a first clevis joint with an axis of rotation. The dual-pivot linkage 64 also has a second clevis mount 70 that faces the opposite direction of the first clevis 62 and is transverse to the first clevis 62.

The second clevis mount 70 of the dual-pivot linkage 64 is connected to a second clevis 72 with a second clevis pin 74 and a second clevis wing nut 76. When connected the second clevis mount 70 and the second clevis 72 form a second clevis joint with an axis of rotation transverse to the axis of rotation formed by the first clevis joint. Preferably, the second clevis mount 70 and the first clevis mount 58 are sized and shaped identically so that the second clevis 72 can be connected to the second clevis mount 70 or the first clevis mount 58. When the second clevis 72 is connected to the first clevis mount 58, the dual-pivot linkage 64 is not present and only a single axis of rotation is possible.

The second clevis 72 is attachable to the extension pole 36 (see FIG. 1) in that the second clevis 72 can be permanently or removeably joined to the extension pole 36. In one embodiment, the second clevis 72 may even be integrated into the extension pole 36 so that it is a permanent part of the extension pole. However, in the preferred embodiment the second clevis 72 can be removeably joined to the extension pole 36 with the type of connection commonly found on telescoping poles for pool cleaning equipment, similar to the connection shown in U.S. Pat. No. 4,247,216. Nonetheless, the second clevis 72 may bejoined to the extension pole 36 in any manner, as long as the junction will withstand the forces exerted on the junction while the filter-changing system 20 is used.

As noted, the mounting means 34 allows the filter-grabbing device 32 to be permanently or temporarily mounted to the extension pole 36. With regard to permanent mounting, the filter-grabbing device 32 may be mounted to the extension pole 36 with a mounting means 34 such as a weld, a solder, a cement, or a glue. In contrast, the mounting means 34 may be a fastener or a plurality of fasteners such as rivets, screws, or bolts, thereby creating a semi-permanent mount between the extension pole 36 and the filter- grabbing device 32. The mounting means 34 may be a temporary mounting system, such as a magnet, Velcro, snaps, or a male/female receptacle on the bottom surface 44 of the holding plate 40 that receives or enters into a corresponding receptacle on the extension pole 36 and is secured thereto.

Further, the mounting means 34 could be other types of pivotable joints similar to the preferred mounting means 34 or a rotational type of joint. For example, in an alternative embodiment the preferred mounting means 34 is inverted such that the structures present in the preferred embodiment are inverted. in this regard, a first clevis and not a first clevis mount 58 would be on the bottom surface 44 of the holding plate 40 and would be connected to a first clevis mount on the dual-pivot linkage 64. An example of a rotational joint that could be employed as the mounting means 34 is a ball-and-socket joint, sometimes known as a ball-and-socket swivel.

Figure 6:
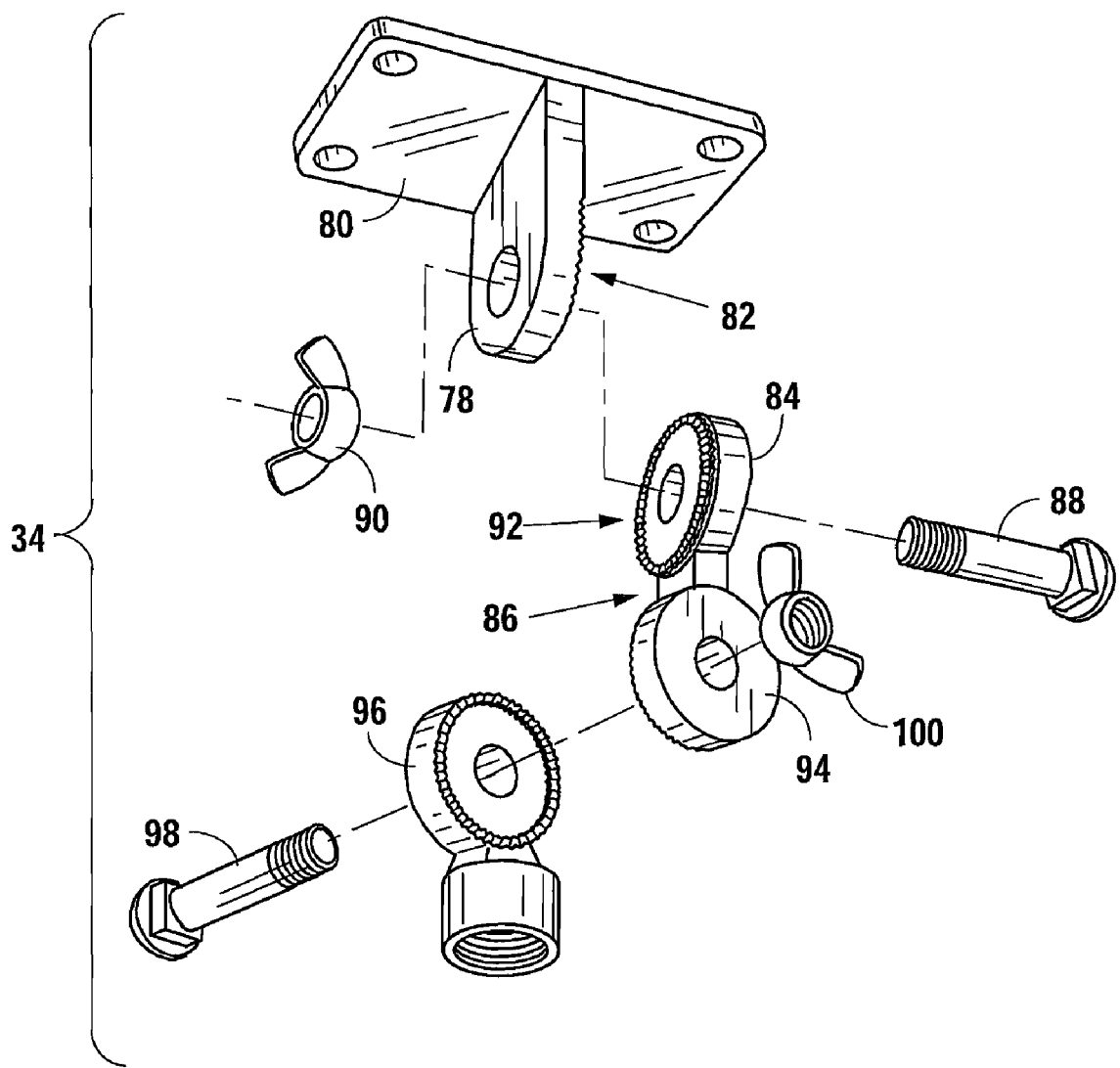
FIG. 6 shows an exploded, bottom perspective view of an alternative embodiment of the mounting means for the present invention.

An alternative embodiment of a pivotable mounting means 34, known as a "Ratchet Mount," is shown in FIG. 6. In the Ratchet Mount mounting means 34, a first half of a ratchet mount 78 has a base 80 and can be attached to the bottom surface 44 of the holding plate 40. Although the first half of a ratchet mount 78 is shown as a separately manufactured piece that attaches to the bottom surface 44 of the holding plate 40 with screws (not shown), the first half of a ratchet mount 78 may be attached in other ways. For example, it may be manufactured as a single piece with the holding plate 40.

The first half of a ratchet mount 78 is rounded on its distal end and has gripping grooves 82. The first half of a ratchet mount 78 connects to a second half of a ratchet mount 84, which is located on a dual-pivot ratchet linkage 86, with a first ratchet fastener 88 and a first ratchet wing nut 90. The second half of a ratchet mount 84 has gripping grooves 92 that engage the gripping grooves 82 on the first half of a ratchet mount 78 when the first ratchet wing nut 90 is tightened. When connected, the first half of a ratchet mount 78 and the second half of a ratchet mount 84 form a first ratchet joint with an axis of rotation.

The dual-pivot ratchet linkage 86 also has a third half of a ratchet mount 94 that faces the opposite direction of the second half of a ratchet mount 84 and is transverse to the second half of a ratchet mount 84. The third half of a ratchet mount 94 connects to a fourth half of a ratchet mount 96 with a second ratchet fastener 98 and a second ratchet wing nut 100. When connected, the third half of a ratchet mount 94 and the fourth half of a ratchet mount 96 form a second ratchet joint with an axis of rotation that is transverse to the axis of rotation formed by the first ratchet joint. Preferably, the first half of a ratchet mount 78 and the third half of a ratchet mount 94 are sized and shaped identically so the fourth half of a ratchet mount 96 is can be connected to the both of them.

The fourth half of a ratchet mount 96 is attachable to the extension pole 36 in that the fourth half of a ratchet mount 96 can be permanently or removeably joined to the extension pole 36. As shown in FIG. 6, the fourth half of a ratchet mount 96 has internal threads to join with an extension pole 36 that has external threads. Nonetheless, any junction capable of withstanding the forces exerted between the extension pole 36 and the fourth half of a ratchet mount 90 during use of the filter-changing system 20 is acceptable.

If the mounting means 34 is a pivotable joint or a rotational joint, the joint is preferably lockable so the filter-grabbing device 32 does not freely pivot or rotate when the filter-changing system 20 is used. In the preferred mounting means 34, the clevises are made from a pliable material, such as plastic, that will deform when pressure is applied. As such, when the wing nuts are tightened the clevis arms compress against the clevis mounts, preventing the first and second clevis joints from pivoting. In the alternative mounting means 34 from FIG. 6, the gripping grooves engage each other when the ratchet wing nuts are tightened, thereby preventing the first and second ratchet joints from pivoting.

Figure 7:
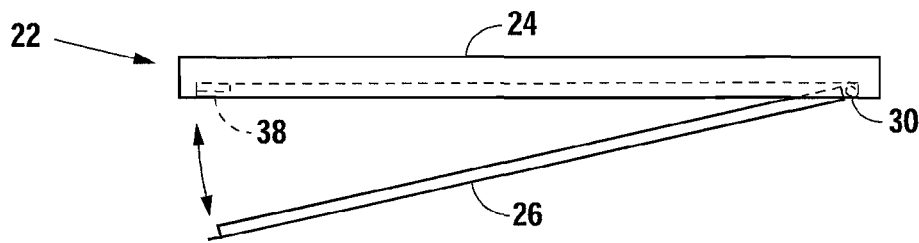
FIG. 7 shows a side view of the preferred location of the preferred holding means when said holding means is mounted to the vent perimeter of the return-air vent.
Figure 8:
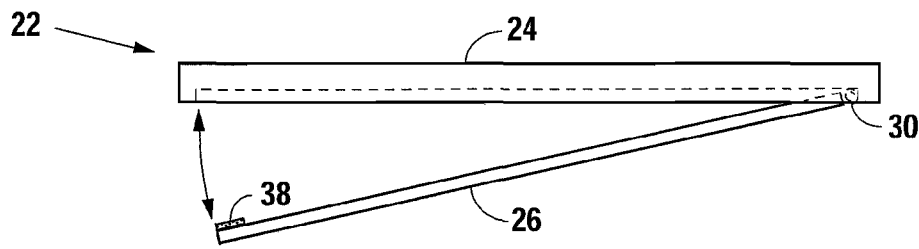
FIG. 8 shows a side view of the preferred location of the preferred holding means when said holding means is mounted to the vent door.
Figure 9:
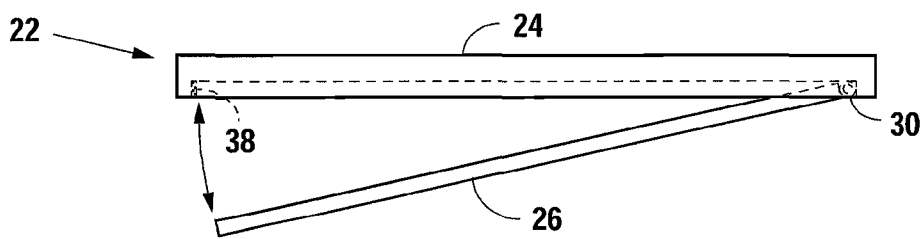
FIG. 9 shows a side view of an alternate location for the preferred holding means when said holding means is mounted to the vent perimeter of the return-air vent.
Figure 10:
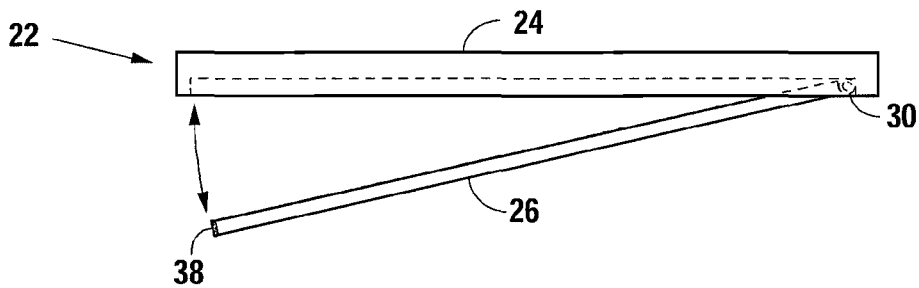
FIG. 10 shows a side view of an alternate location for the preferred holding means when said holding means is mounted to the vent door.

FIGS. 7 through 10 show different locations of the preferred holding means 38 present in the preferred embodiment. The holding creates a force that holds the vent door 26 closed, yet, due to the nature of the holding means 38, will allow the force to be overcome when the vent door 26 is pulled with the filter-grabbing device 32. As noted, the preferred embodiment of the holding means 38 is a plurality of magnets mounted on the return-air vent 22. The magnets may be mounted to the vent door 26, as shown in FIGS. 8 & 10, or they may be mounted to the vent perimeter 24 of the return-air vent 22, as shown in FIGS. 7 and 9. Regardless of their location on the return-air vent 22, the magnets must be positioned so their magnetic force holds the vent door 26 closed.

It also should be noted that other holding means 38 could be used to hold the vent door 26 closed. For example, a ball detent, or some other kind of detent, may be mounted on the vent door 26 or the vent perimeter 24. If mounted on the vent door 26, the vent perimeter 24 has corresponding structure for the ball detent to enter into so the vent door 26 is held closed. On the other hand, if the ball detent is mounted on the vent perimeter 24, the vent door 26 has corresponding structure for the ball detent to enter into so the vent door 26 is held closed.

Figure 11:
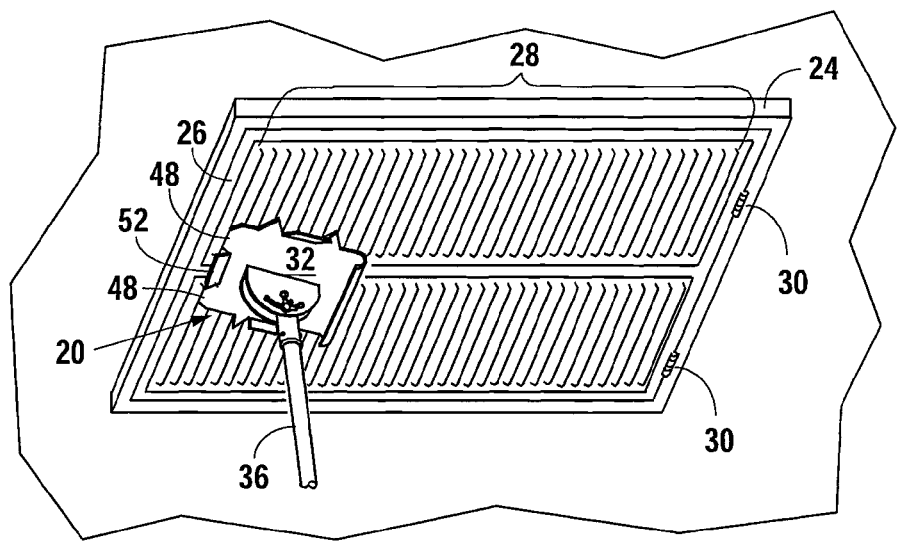
FIG. 11 is a bottom perspective view showing the filter-grabbing device engaged with the vent door prior to opening.
Figure 12:
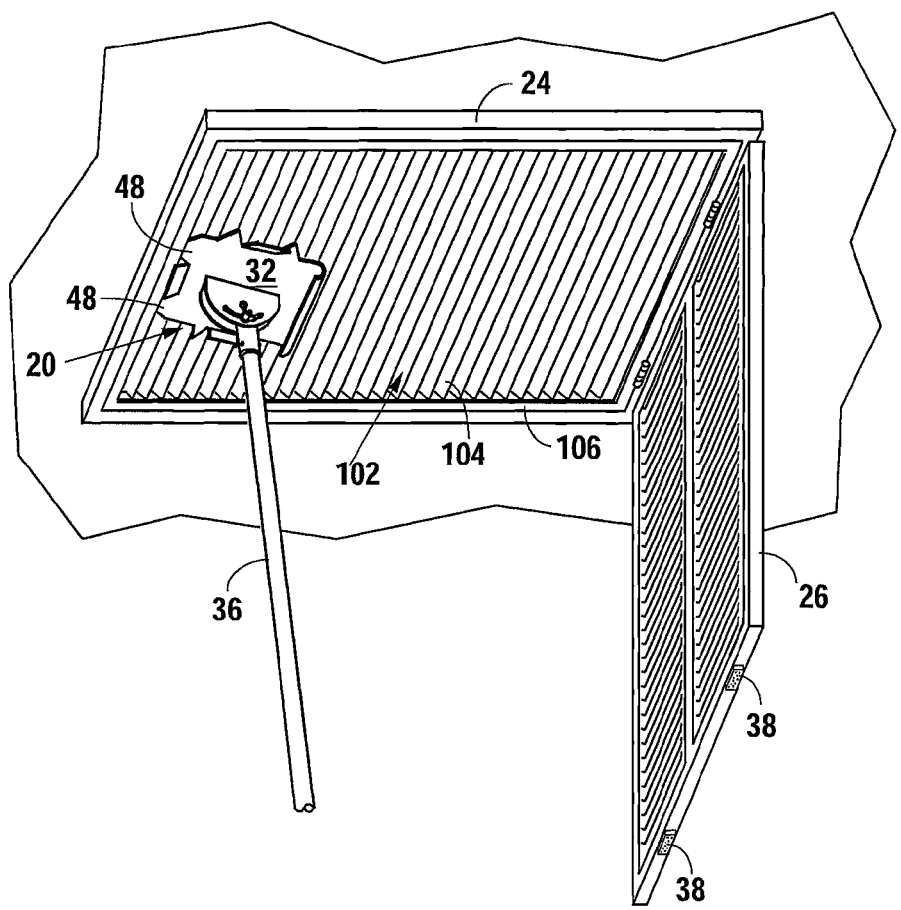
FIG. 12 is a bottom perspective view showing the filter-grabbing device engaged with an air filter after the vent door has been opened.
Figure 13:
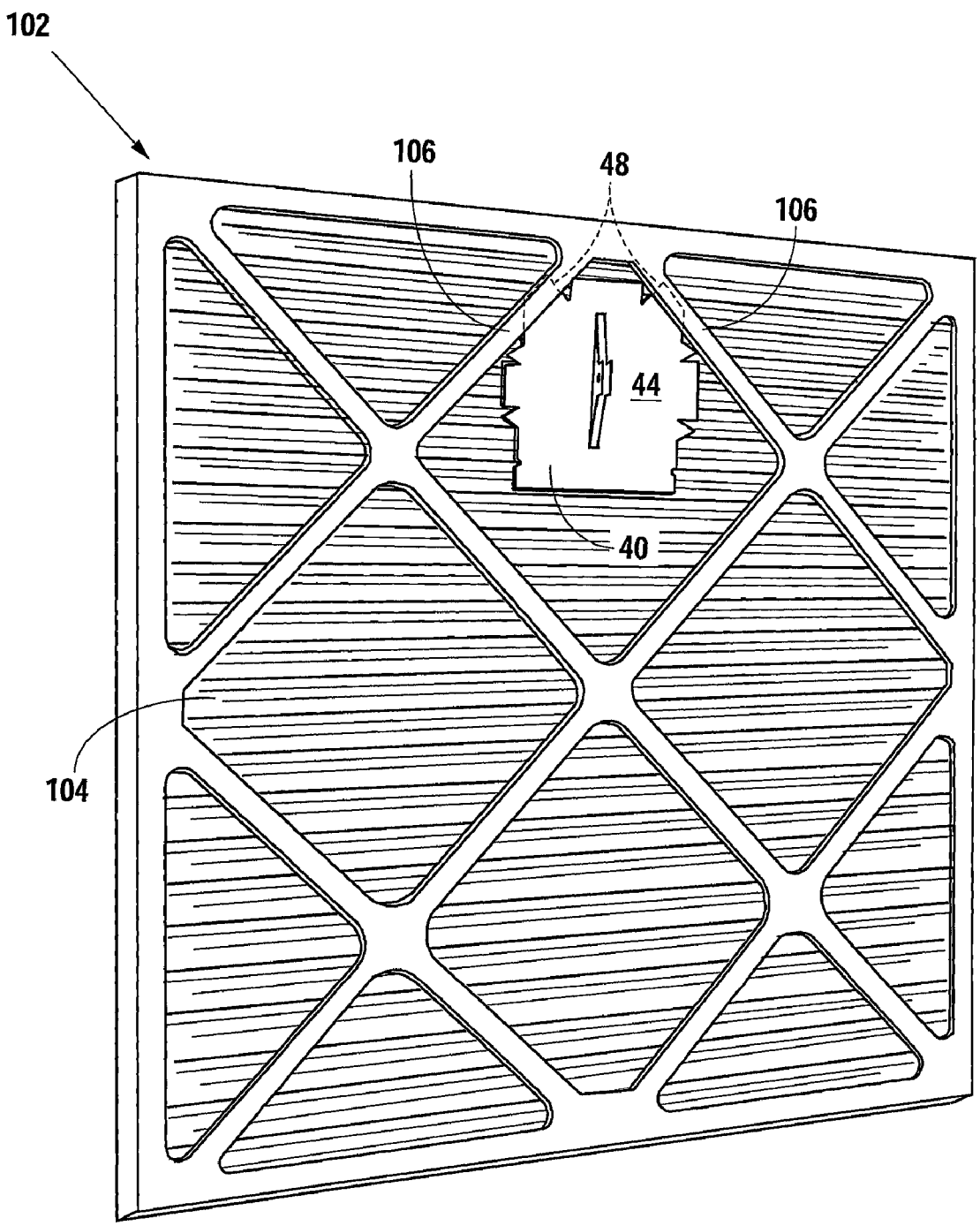
FIG. 13 is a perspective view showing the filter-grabbing device engaged with support structures on an air filter.

FIGS. 11 through 13 illustrate the functionality of the preferred embodiment of the present invention. In FIG. 11, the vent door 26 is shown in a "closed" position, with the preferred holding means 38 holding the vent door 26 at the vent perimeter 24 of the return-air vent 22. Two teeth from the plurality of teeth 48 are inserted into the grill louvers 28 on the vent door 26. Using the extension pole 36, the user pulls the vent door 26 away from the magnetic force of the preferred holding means 38 and the vent door 26, which is attached to the vent perimeter 24 with hinges 30, swings from the vent perimeter 24 of the return-air vent 22.

As the vent door 26 swings from the vent perimeter 24, there is a tendency for the teeth that are inserted into the grill louvers 28 to get caught in the louvers. This tendency is attributed to the fact that the angle of insertion of the teeth into the grill louvers 28 changes as the vent door 26 swings open. To combat this tendency, the kicker plates 52 are present in the preferred embodiment. The downward angle of the kicker plates 52 from the holding plate 40 causes the inserted teeth to push out of the grill louvers 28 as the vent door 26 swings open and the angle of insertion changes.

With the vent door 26 open, an air filter 102 is exposed but remains in place because the blower is running. In its most basic form, the air filter 102 is made from a filter media 104 and a support structure 106. The filter media 104 filters dust and other particles from the external air as it passes through the filter media 104 and into the HVAC system. The filter support structure 106 is external to the filter media 104 and prevents the filter media 104 from being sucked into the HVAC system. In this regard, when dust and other particles accumulate on the filter media 104, a vacuum forms between the filter media 104 and the blower in the HVAC system. Without the support structure 106, the vacuum created by the blower on the filter media 104 would cause the filter media 104 to be sucked into the HVAC system.

To remove the air filter 102, teeth from the plurality of teeth 48 on the filter-grabbing device 32 are inserted between the filter media 104 and the support structure 106 on the air filter 102. In FIG. 12, the support structure 106 is only at the perimeter of the filter media 104. In FIG. 13, the support structure 106 is at the perimeter around the filter media 104 and includes cross members that span the filter media 104.

In FIG. 13, the teeth from the plurality of teeth 48 are shown inserted between two cross members of the support structure 106, and shows the functionality of the predetermined distances between the sets of teeth. Though not required, the teeth on the filter-grabbing device 32 will preferably be inserted at the center of one side of the air filter 102, which allows the air filter 102 to be better balanced on the holding plate 40 of the filter-grabbing device 32. The configuration of the cross members in the air filter 102 can vary from filter to filter, and as shown in FIG. 13, the cross members of the support structure 106 may interfere with the teeth's insertion. As such, the teeth on each side 46 of the holding plate 40 are spaced apart from each other at different distances to address the different configurations and designs of air filters.

Although not shown, once the teeth are inserted between the filter media 104 and the support structure 106, the dirty air filter 102 is pulled from the vent perimeter 24 of the return-air vent 22. With the teeth still inserted between the filter media 104 and the support structure 106, the removed air filter 102 balances on the top surface 42 of the holding plate 40. The user brings the dirty air filter 102 down from its elevated position, grabs the air filter 102 by hand, and removes the air filter 102 from the filter-grabbing device 32.

The user then places a clean air filter on the filter-grabbing device 32, lifts the clean filter toward the elevated return-air vent 22, and allows the blower to suction the clean air filter into place. After the clean air filter is in place and being held in the return-air vent 22 by the blower, the filter-grabbing device 32 is removed. Then, using the curved end 50 that is present in the preferred embodiment, the vent door 26 is pushed back into the "closed" position and the holding means 38 holds it there.

Finally, it should be noted that the preferred mounting means 34, allows the angles between the filter-grabbing device 32 and the extension pole 36 to be changed. The ability to change the angle of the filter-grabbing device 32 with respect to the extension pole 36 facilitates use of the present invention when access to the return-air vent 22 is restricted by a piece of furniture or other heavy object located under the return-air vent 22. In this regard, if the piece of furniture were directly under the return-air vent 22, the user would have to maneuver the filter-grabbing device 32 so the holding plate 40 and the teeth extending therefrom were properly oriented for insertion into the grill louvers 28 and into the dirty air filter 102. With the preferred mounting means 34, as well as other pivotable or rotateable mounting means 34, the filter-grabbing device 32 could be properly oriented for insertion of the teeth without extensive maneuvering.

Although the present invention has been described with reference to specific embodiments, this description is not meant to be construed in a limiting sense. Various modifications of the disclosed embodiments, as well as alternative embodiments of the invention will become apparent to persons skilled in the art upon the reference to the above-description of the invention. It is, therefore, contemplated that the appended claims will cover such modifications that fall within the scope of the invention.

I claim:

1. An air conditioner filter-changing system for changing an air filter located in an elevated return-air vent that has a vent door containing grill louvers, wherein said filter-changing system comprises:
    a filter-grabbing device, said filter-grabbing device comprising:
        a holding plate with a substantially flat top surface, a bottom surface, and a plurality of sides;
        at least one tooth protruding from at least one side of said holding plate and aligned in the range from substantially planar with said top surface to slightly angled from said top surface;
        said at least one tooth being sized and shaped for insertion into at least one grill louver on said vent door and being capable of pulling said vent door open;
        said at least one tooth also being sized and shaped for insertion between the filter media and support structure of an air filter;
        at least one kicker plate protruding at a downward angle from said holding plate, said at least one kicker plate protruding from at least one of said plurality of sides where said at least one tooth is located; and,
    a mounting means for mounting said filter-grabbing device to an extension pole, said mounting means being attached to the bottom surface of said filter-grabbing device.

2. The air conditioner filter-changing system of claim 1 wherein said filter-changing system further comprises a holding means mountable on said air return vent, said holding means creating a force that is configured to hold said vent door of said air-return vent closed and said force being configured to be overcome when said vent door is pulled away from said return-air vent.

3. The air conditioner filter-changing system of claim 2 wherein said holding means comprises at least one magnet.

4. The air conditioner filter-changing system of claim 1 wherein said at least one tooth is a plurality of teeth.

5. The air conditioner filter-changing system of claim 1 wherein said top surface of said holding plate is substantially rectangular.

6. The air conditioner filter-changing system of claim 1 wherein said holding plate of said filter-grabbing device further comprises a curved end at one of said plurality of sides.

7. The air conditioner filter-changing system of claim 1 wherein said holding plate of said filter-grabbing device comprises at least one notch in at least one of said plurality of sides.

8. The air conditioner filter-changing system of claim 1 wherein said filter-changing system further comprises an extension pole mountable to said bottom surface of said holding plate with said mounting means.

9. The air conditioner filter-changing system of claim 1 wherein said mounting means comprises at least one pivotable joint.

10. The air conditioner filter-changing system of claim 9, wherein said at least one pivotable joint is lockable.

11. The air conditioner filter-changing system of claim 9 wherein said mounting means comprises:
    a first clevis mount attached to said bottom surface of said holding plate;
    a dual-pivot linkage, said dual-pivot linkage having a first clevis and a second clevis mount oppositely facing and transverse to said first clevis, said first clevis being mateable with said first clevis mount;

a first clevis pin receivable through said first clevis mount and through said first clevis when said first clevis mount and said first clevis are mated;

a first clevis joint, said first clevis joint being formed when said first clevis pin is received through said first clevis mount and said first clevis;

a second clevis attachable to said extension pole, said second clevis being mateable with said second clevis mount;

a second clevis pin receivable through said second clevis mount and through said second clevis when said second clevis mount and said second clevis are mated; and, a second clevis joint, said second clevis joint being formed when said second clevis pin is received through said second clevis mount and said second clevis.

12. The air conditioner filter-changing system of claim 11 wherein said second clevis is mateable with said first clevis mount.

13. The air conditioner filter-changing system of claim 12 wherein said first clevis joint and said second clevis joint are lockable.

14. The air conditioner filter-changing system of claim 9 wherein said mounting means comprises:

a first half of a ratchet mount attached to the bottom surface of said holding plate;

a dual-pivot ratchet linkage, said dual-pivot ratchet linkage having a second half of a ratchet mount and a third half of a ratchet mount oppositely facing and transverse to said second half of a ratchet mount;

a first ratchet fastener receivable through said first half of a ratchet mount and through said second half of a ratchet mount when said first half of a ratchet mount and second half of a ratchet mount are mated;

a first ratchet joint, said ratchet joint being formed when said first ratchet fastener is received through said first half of a ratchet mount and said second half of a ratchet mount;

a fourth half of a ratchet mount attachable to said extension pole, said fourth half of a ratchet mount being mateable with said third half of a ratchet mount;

a second ratchet fastener receivable through said third half of a ratchet mount and through said fourth half of a ratchet mount when said third half of a ratchet mount and said fourth half of a ratchet mount are mated; and, a second ratchet joint, said second ratchet joint being formed when said second ratchet fastener is received through said third half of a ratchet mount and said fourth half of a ratchet mount.

15. The air conditioner filter-changing system of claim 14 wherein said fourth half of a ratchet mount is mateable with said first half of a ratchet mount.

16. A method of removing an air filter in an elevated return-air vent that has a vent door with grill louvers comprising:

mounting a filter-grabbing device to an extension pole with a mounting means;

extending said filter-grabbing device toward said elevated return-air vent;

orienting at least one tooth from said filter-grabbing device for insertion of said at least one tooth for insertion between at least two of said grill louvers;

inserting said at least one tooth between at least two of said grill louvers, pulling said vent door from said elevated return-air vent with said at least one tooth inserted between at least two of said grill louvers;

removing said at least one tooth from between said at least two grill louvers;

inserting said at least one tooth between the filter media and the filter support structure of said air filter, pulling said air filter from said return-air vent;

balancing said air filter on a holding plate of said filter-grabbing device; and;

bringing said air filter down from said elevated return-air vent.

17. The method of removing an air filter in an elevated return-air vent as recited in claim 16 wherein said step of removing said at least one tooth from between said at least two grill louvers further comprises forcing said at least one tooth from between said at least two grill louvers with a kicker plate.

18. An air conditioner filter-changing system for changing an air filter located in an elevated return-air vent that has a vent door containing grill louvers, wherein said filter-changing system comprises:

a filter-grabbing device, said filter-grabbing device comprising:

a holding plate with a substantially flat top surface, a bottom surface, and a plurality of sides;

at least one tooth protruding from at least one side of said holding plate and aligned in the range from substantially planar with said top surface to slightly angled from said top surface;

said at least one tooth being sized and shaped for insertion into at least one grill louver on said vent door and being capable of pulling said vent door open;

said at least one tooth also being sized and shaped for insertion between the filter media and support structure of an air filter;

a frictionous material attached to said top surface of said holding plate; and, a mounting means for mounting said filter-grabbing device to an extension pole, said mounting means being attached to the bottom surface of said filter-grabbing device.

* * * * *